United States Patent Office 2,886,779
Patented May 12, 1959

2,886,779

ELECTRIC CURRENT MEASURING TRANSFORMER

Friedrich Kuhrt and Karl Maaz, Nurnberg, Germany, assignors to Siemens-Schuckertwerke Aktiengesellschaft, Berlin-Siemensstadt, and Erlangen, Germany, a corporation of Germany Application July 11, 1956, Serial No. 597,216

Claims priority, application Germany July 14, 1955

7 Claims. (Cl. 324—127)

This invention relates to an electric current measuring device. It particularly concerns direct-current transforming devices and is related to the invention disclosed in the copending application Serial No. 452,023, filed August 25, 1954, by Friedrich Kuhrt and assigned to the assignee of the present invention.

The said copending application relates to devices for measuring electric currents. It particularly relates to a device for measuring direct currents based upon the principle of utilizing variations in the electric parameters of semiconductors subjected to a magnetic field. In the copending application there is disclosed a circuit in which a Hall generator, namely a magnetic-field responsive semiconductor which is particularly of the type $A_{III}B_V$, is disposed in the magnetic field of an electric current. The Hall voltage of the Hall generator, being proportional to the intensity of the electric current, is utilized for measuring that intensity.

A particular object of the present invention is to improve the device to make it suitable for measuring very high direct-current intensities.

For measuring the absolute magnitude of very high direct-currents, it is today generally customary to employ direct-current transformers. The available transformers of this general type employ the principle of compensating the primary ampere winding turns of the direct current by a secondary number of ampere winding turns connected to an alternating-current supply line. This type of measuring transformer, however, possesses a serious disadvantage which is inherent in the basic principle of the measuring performance, and which cannot be fully eliminated by any corrective expedients. Since the operating principle requires the compensating of the total induction in the iron core, the device is extremely sensitive to any iron located in its vicinity as well as to stray magnetic fields. For that reason, the particular arrangement of the current busses leading to the transforming device, as well as of the magnetic fields of other independent electric and magnetic circuits, and the presence of masses of iron in the vicinity, or even the iron inserts in reinforced concrete foundations and buildings, may cause considerable error in measurements made by such direct-current transforming devices. When such a transforming device, in the course of its manufacture, is tested, calibrated in the testing laboratory, and shipped to its place of installation, in most cases it is still necessary to carry out a subsequent compensation and calibration depending upon the particular local conditions. In some cases it is even necessary to change the mounting of the current supply busses or leads. The disturbing influences of other independent circuits cannot be compensated at all because the current intensity in such independent devices may vary at any time.

It was known to measure electric currents by means of devices which have a magnetic iron circuit provided with a single air gap that contains a single Hall generator. Such devices are described in U.S. Patents 2,562,120 and 2,736,822 as well as in the article "The Proceedings of the Institute of Electrical Engineers," pages 179 to 185, part B, No. 2, of March 1955, and also in "Review of Scientific Instruments," pages 263 to 265, No. 4, of April 1948. As explained above, these known devices have the disadvantage that the measurement is subject to error caused by iron bodies located in the vicinity as well as by the stray fields of other electric circuits. Heretofore such magnetic fields could not be compensated at all, or only to an unsatisfactory extent.

For such reasons, there is a great need for a direct-current measuring transformer which eliminates such faults. It is a more specific object of our invention to provide such a direct-current transformer.

To this end and in accordance with a preferred embodiment of our invention, the direct-current measuring is effected by means of two Hall-voltage generators which are preferably of the type $A_{III}B_V$, and the respective Hall circuits of which are connected in series with each other. Each of these Hall generators is located in one of two respective air gaps of a two-part iron core which is placed around the direct-current bus. A constant auxiliary direct current is passed through the two Hall generators. The sum of the two Hall voltages, for a linear magnetization characteristic of the magnetic core material, is an accurate measure of the magnitude of the two air-gap inductions and thus also for the direct current to be measured. This current is mathematically equal or proportional to the integral of the magnetic field lines, that is, the field strength along the air gaps, when the length of the magnetic circuit within the iron core is neglected. The magnetic field strength is a linear function of the air-gap induction. The width of the air gap does not affect these considerations. However, in the preferred embodiment, the width is a predetermined constant.

Although theoretically it is possible to surround the direct-current bus with a core having only one air gap in which only one Hall generator is located, such an arrangement is unfavorable or virtually unsuitable for the purpose of the present invention for the following reasons. In the first place, the air gap-less limb of the core would become saturated by field displacement at relatively low current intensities before the field strength in the air gap has reached a more than slight value. For that reason, the limb of the core that does not have the air gap would have to be given a larger cross section, with the result that the field system would become asymmetrical. In order to avoid such saturation, the air gap would have to be made very large for the measuring of high current intensities. The apparatus would have to be provided with an air gap of a width so great that considerable straying of the field lines would have to be contended with. Furthermore, a core with only one air gap, just like the ring-shaped cores of the transformers heretofore available, makes it necessary to provide for a jumper current passage as well as for interruption of the current bus for the purpose of installing the transformer.

All these disadvantages are avoided by the present invention due to the fact that the iron core consists of two preferably U-shaped parts which can be mounted at any desired location of the current busses in a new as well as in any already existing distribution or load system without requiring a change or interruption of the bus. The total width of the air gaps is distributed over two such gaps with the result that the homogeneity of the field is preserved to a large extent. The two core parts are preferably given the same cross-sectional area, thus resulting in a completely symmetrical arrangement. In order to permit measuring absolute magnitudes of current, each air gap must be provided with a separate Hall generator. In special cases, for instance for direct currents of extremely high magnitude, it is also possible to provide the core system with more than two air gaps and with a correspondingly larger number of Hall generators.

The foregoing objects, advantages and features of the invention will be more fully described with reference to the preferred embodiment illustrated in the drawing in which.

Figure 1A:
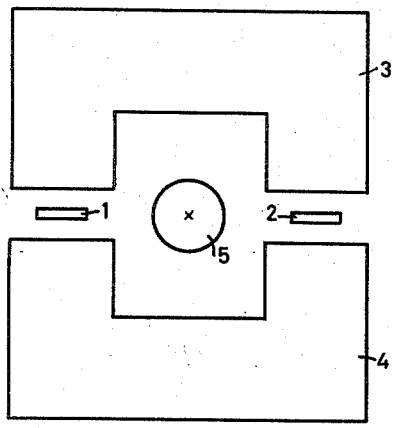
Fig. 1a is a schematic elevational view.

According to Fig. 1a the apparatus is provided with a magnetizable core composed of two parts 3 and 4 which are preferably laminated in the usual manner. The two parts are of identical design and are U-shaped. They form between each other two air gaps which in Fig. 1a are shown exaggerated but in reality are just wide enough to receive in each gap the semiconductor member of a Hall generator 1 or 2. The semiconductor body of each Hall generator consists preferably of an $A_{III}B_V$ compound. This signifies a semiconductor compound of boron, aluminum, gallium, or indium with nitrogen, phosphorus, arsenic or antimony. Best suited for many purposes are semiconductors of indium antimonide or indium arsenide.

Figure 1B:
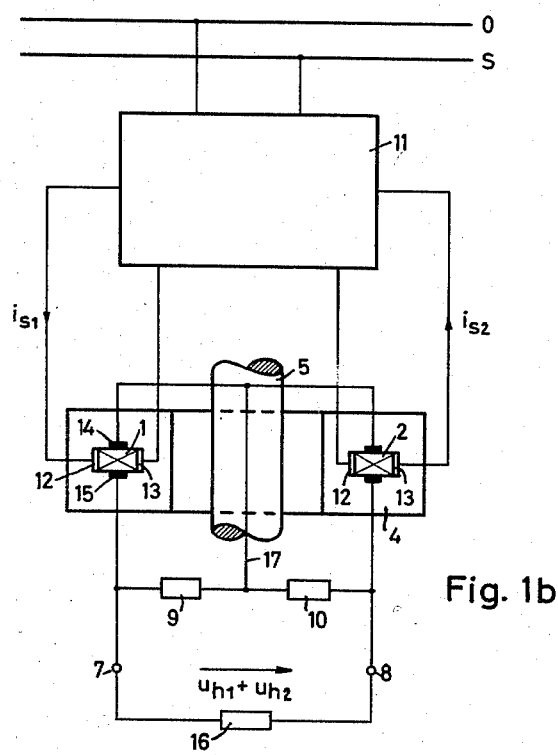
Fig. 1b is an electric circuit diagram of the same device seen from above, but with core 3 removed for simplification.

Aside from the current supply terminals 12 and 13, each plate-shaped semiconductor body is provided with two Hall electrodes 14 and 15, as is shown for the Hall generator 1 in Fig. 1b. When no magnetic field acts upon the semiconductor member while the semiconductor member is being traversed by current between its terminals 12 and 13, the two Hall electrodes 14 and 15 have the same electric potential. However, when the semiconductor member is subjected to the magnetic field of the current in bus 5, the two Hall electrodes assume respectively different potentials, so that a Hall voltage is generated between them.

According to the circuit diagram of Fig. 1b, each of the two Hall generators is traversed by a constant auxiliary direct current $i_{s1}$ or $i_{s2}$ respectively, and each is also traversed by the field lines of the magnetic field caused by the direct current to be measured. The latter current flows through a bus 5 which passes through the opening of the core. The auxiliary direct current is drawn from the regulating apparatus 11. Due to the simultaneous effects of the magnetic field and of the auxiliary direct current, a Hall voltage is generated in each of the two Hall generators. The two Hall voltages are added by means of the illustrated series connection and are applied to a direct-current measuring instrument 16 which may be connected to the terminals 7 and 8. Two resistors 9 and 10 are connected through intermediate lead 17 to provide a basic load for the Hall generators. The indication of the instrument 16 measuring the voltage across terminals 7 and 8 is accurately proportional to the intensity of the direct current to be measured, so long as the auxiliary direct currents are kept constant and the device is operating in the linear portion of the magnetic characteristic of the core material. Under these conditions the ratio of Hall voltage to magnetic induction is likewise constant.

These conditions are readily satisfied, particularly by a suitable choice of the magnetizable core material. We preferably use for this purpose a silicon-containing sheet iron which during manufacture has been given a preferred magnetic orientation. This material is available, for instance, under the trade name Trancor XXX or oriented M7X. Such materials exhibit negligible departure from the linearity of the magnetic characteristic up to very high values of induction (about 17,000 gauss). As mentioned, it is also preferable to give the core a laminated design.

Figure 2:
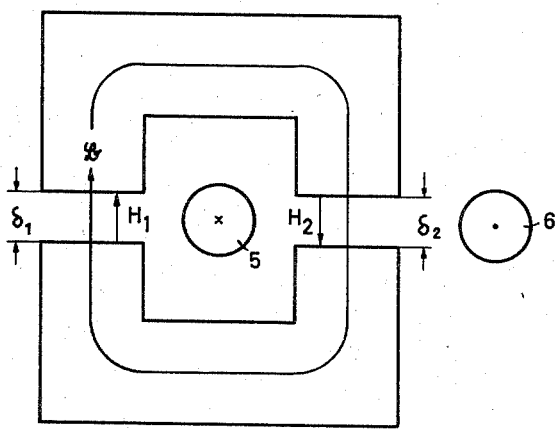
Fig. 2 is explanatory, being a simplified representation of the electric and magnetic field conditions obtaining in the system.

Fig. 2 indicates the formation of the magnetic field strengths $H_1$, $H_2$ in the two air gaps. Neglecting the iron path, the line integral $\phi Hds + H_1\delta_1 + H_2\delta_2$ is an accurate measure of the current intensity in the bus 5. Stray fields, including fields of a current different from those originating from the current flowing in the current-return bus 6, traverse the two air gaps in the same direction and thus do not enter into the measurement. The return bus 6 can be installed in any way desired.

As stated above, the main object of the present invention is to devise a measuring device free of the above-mentioned deficiencies. This aim is achieved by placing a plurality of Hall voltage generators, preferably of the type $A_{III}B_V$, in respective air gaps of the two-part iron core 3, 4 placed about the current conducting bus 5, and connecting these two or more Hall voltage generators in series relative to their Hall-electrode circuits. With a linear magnetizing characteristic of the core material, provided by said silicon-iron sheet, the sum of the Hall voltages in such a device is an accurate measure of the magnitude of the air-gap inductions in the plurality gaps, and thus also an accurate measure of the current to be measured. The series connection just mentioned achieves some increase in the measuring magnitude obtained. The important effect of the series connection is that it makes ineffectively any stray fluxes, as well as any effects of extraneous fields.

A direct current measuring apparatus according to the invention is particularly suitable for measurements in electrolysis plants, because of its extremely high degree of accuracy. By virtue of the invention as described above, there have been achieved error limits of less than ±0.1%, the accuracy being virtually dependent only upon the constancy obtainable for the two auxiliary currents $i_{s1}$ and $i_{s2}$. For this purpose, it is preferable to use a regulating device which continuously compares the auxiliary current magnitude with a normal or standard current magnitude. Dependent upon the principle of operation of such a generally known regulation, the "normal" comparison standard may consist of a stabilizing tube, a permanent magnet, a standard primary cell, or other primary standard devices. When using such a regulation, a measuring transformer according to the invention is also particularly favorable for metering the ampere-hour magnitude of high intensity direct currents. The power output of the measuring transformer, in all cases, is mainly dependent upon the magnitude of the auxiliary direct currents.

The apparatus is also capable of use as an automatic control means. In such case, the apparatus 16 of the drawing may be taken as schematically representing any device, such as a thermionic valve grid bias circuit, responsive to the disclosed Hall potential difference or gradient.

The core may be U- or V-shaped or may comprise parts of a toroidal ring.

Although in the preferred embodiment each of the semiconductors has two Hall-effect electrode terminals, it is obvious to persons skilled in the art that one each may suffice, and that the produced Hall-effect potentials may be applied additively, that is, in summation, to a sensitive instrument, or instrumentality, even where only one Hall electrode terminal is present on each semiconductor. This is accomplished by employing the Hall potential gradient established on each semiconductor between its Hall electrode terminal and the required one of its current-supply terminals. However, the more advantageous arrangement is that shown in the preferred embodiment above.

We claim:

1. A direct current measuring apparatus for measuring the magnitude of a characteristic of a direct current, comprising a conductor traversed by the said direct current, the magnitude of a characteristic of which is to be measured, a magnetic yoke comprised of material having a substantially linear magnetization characteristic in the range of operation, the magnetic yoke being spaced about said conductor and being in the magnetic field produced by the direct current in said conductor, the magnetic field in said yoke being controlled by the latter, said yoke having a pair of substantially equal gaps at opposite sides of the conductor, the respective yoke paths between opposite sides of the said pair of gaps being of substantially equal magnetic reluctance, magnetic field responsive semiconductors respectively disposed in the gaps, the semiconductors having like Hall-effect characteristics, means for passing an auxiliary constant direct current through each of the said semiconductors in a direction crosswise of the linese of magnetic force of the said field established by the direct current, whereby said magnetic field assists in establishing an electric potential gradient in each semiconductor in a direction crosswise of the direction of said passage of the direct current through each of the semiconductors, a Hall voltage terminal for each of said semiconductors at the region across which the said potential gradient is established, means electroconductively connecting the respective terminals in series in Hall voltage adding relation, and measuring means responsive to the sum of the said electric potential gradients.

2. The apparatus of claim 1, the yoke being composed of two substantially identical U-shaped parts.

3. The apparatus of claim 1, the semiconductor being indium antimonide.

4. The apparatus of claim 1, the semiconductor being indium arsenide.

5. A direct current measuring apparatus for measuring the magnitude of a characteristic of a direct current, comprising a conductor traversed by the said direct current, the magnitude of a characteristic of which is to be measured, a magnetic yoke comprised of material having a substantially linear magnetization characteristic, the magnetic yoke being spaced about said conductor and being in the magnetic field produced by the direct current in said conductor, the magnetic field in said yoke being controlled by the latter, said yoke having a pair of substantially equal gaps at opposite sides of the conductor, the respective yoke paths between opposite sides of said pair of gaps being of substantially equal magnetic reluctance, magnetic field responsive semiconductors respectively disposed in the gaps, the semiconductors having like Hall-effect characteristics, means for passing an auxiliary constant direct current through each of the said semiconductors in a direction crosswise of the lines of magnetic force of the said field established by the direct current, two Hall voltage terminals for each of said semiconductors, means electroconductively connecting the respective terminals in series in Hall voltage adding relation, and measuring means responsive to the sum of the said electric potential gradients.

6. The apparatus of claim 1, the linear magnetization characteristic being at least up to 17,000 gauss.

7. The apparatus of claim 1, the semiconductor being a compound of an element of the group consisting of boron, aluminum, gallium, and indium with an element selected from the group consisting of nitrogen, phosphorus, arsenic, and antimony.

References Cited in the file of this patent

UNITED STATES PATENTS

| | | |
|---|---|---|
| 2,562,120 | Pearson | July 24, 1951 |
| 2,736,822 | Dunlap | Feb. 28, 1956 |
| 2,798,989 | Welker | July 9, 1957 |

OTHER REFERENCES

Article by H. E. M. Barlow published in The Proceedings of the Institute of Electrical Engineers, pages 179–185, vol. 102, part B, No. 2, March 1955. (Copies available in Scientific Library and 324–45.) (Only Fig. 4, page 181, and Fig. 8, page 182, relied upon.)

Article by G. L. Pearson published in the Review of Scientific Instruments, pages 263–265, vol. 19, No. 4, April 1948. (Copies available in Scientific Library and 324–45.) (Only Fig. 3, page 264 relied upon.)